United States Patent
Kolovich et al.

(10) Patent No.: US 6,662,410 B2
(45) Date of Patent: Dec. 16, 2003

(54) INJECTION-MOLDED END STOP FOR A SLIDER-OPERATED FASTENER

(75) Inventors: Nathan A. Kolovich, Rochester, NY (US); Russell J. Talbo, Lyons, NY (US); Joseph W. Eye, Orchard Park, NY (US); William F. Klepser, Jr., Snyder, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 10/292,177

(22) Filed: Nov. 12, 2002

(65) Prior Publication Data

US 2003/0056341 A1 Mar. 27, 2003

Related U.S. Application Data

(62) Division of application No. 09/636,244, filed on Aug. 10, 2000, now Pat. No. 6,508,969.

(51) Int. Cl.[7] .......................... A44B 19/38; B65D 33/20
(52) U.S. Cl. ........................... 24/399; 24/387; 24/433; 24/436; 24/585.12; 383/63
(58) Field of Search ...................... 24/399, 400, 30.5 R, 24/433, 435, 387, 388, 572.1, 585.12; 383/63, 64, 65

(56) References Cited

U.S. PATENT DOCUMENTS

| | | | |
|---|---|---|---|
| 2,920,354 A | 1/1960 | Zumbrunnen | |
| 3,196,196 A | 7/1965 | Burbank | |
| 3,381,592 A | 5/1968 | Ravel | |
| 3,473,589 A | 10/1969 | Gotz | |
| 3,532,571 A | 10/1970 | Ausnit | |
| 3,590,109 A | 6/1971 | Doleman et al. | |
| RE27,174 E | 9/1971 | Ausnit | |
| 3,608,439 A | 9/1971 | Ausnit | |
| 3,613,524 A | 10/1971 | Behr et al. | |
| 3,701,191 A | 10/1972 | Laguerrre | |
| 3,701,192 A | 10/1972 | Laguerrre | |
| 3,758,657 A | 9/1973 | Menzin et al. | |
| 3,785,111 A | 1/1974 | Pike | |
| 3,833,329 A | 9/1974 | Ulmachneider et al. | |
| 3,839,128 A | 10/1974 | Arai | |
| 3,918,864 A | 11/1975 | Braun | |
| 3,948,705 A | 4/1976 | Ausnit | |
| 4,094,729 A | 6/1978 | Boccia | |
| 4,137,034 A | 1/1979 | Moertel | |
| 4,160,636 A | 7/1979 | Magherini | |
| 4,163,768 A | 8/1979 | Stephens | |

(List continued on next page.)

FOREIGN PATENT DOCUMENTS

| | | | | |
|---|---|---|---|---|
| DE | 2254518 | * | 5/1974 | ............. 24/399 |
| EP | 0 939 034 | | 9/1999 | |
| EP | 0 978 450 | | 2/2000 | |
| EP | 1 026 077 A2 | | 8/2000 | |
| GB | 2 085 519 | | 4/1982 | |
| WO | WO 99/24325 | | 5/1999 | |

Primary Examiner—Victor Sakran
(74) Attorney, Agent, or Firm—Jenkens & Gilchrist

(57) ABSTRACT

A fastener arrangement includes a fastener, a slider, and an injection-molded end stop. The fastener includes first and second tracks. The first track includes a first profile, and the second track includes a second profile for interlocking with the first profile. The fastener extends between first and second ends. The slider is slidably mounted to the fastener for movement between the first and second ends. The injection-molded end stop is located at at least one of the first and second ends. The end stop terminates the movement of the slider at the one of the first and second ends. The end stop includes interior plastic material disposed in an interior of the fastener between the first and second profiles. The one of the first and second ends includes a cut edge at an angle relative to an axis of the fastener extending between the first and second ends. The end stop may include exterior plastic material along an exterior of the fastener outside the first and second profiles and covering the cut edge. A method of forming the end stop is also disclosed.

31 Claims, 5 Drawing Sheets

U.S. PATENT DOCUMENTS

| | | | |
|---|---|---|---|
| 4,186,161 A | 1/1980 | Ulmschneider et al. | |
| 4,196,030 A | 4/1980 | Ausnit | |
| 4,235,584 A | 11/1980 | Yunoki | |
| 4,240,241 A | 12/1980 | Sanborn, Jr. | |
| 4,246,288 A | 1/1981 | Sanborn, Jr. | |
| 4,251,912 A | 2/1981 | Yoshida | |
| 4,269,588 A | 5/1981 | Nogai | |
| 4,277,241 A | 7/1981 | Schulze | |
| 4,341,575 A | 7/1982 | Herz | |
| 4,355,494 A | 10/1982 | Tilman | |
| 4,372,793 A | 2/1983 | Herz | |
| 4,415,386 A | 11/1983 | Ferrell et al. | |
| 4,424,015 A | 1/1984 | Black et al. | |
| 4,430,070 A | 2/1984 | Ausnit | |
| 4,437,293 A | 3/1984 | Sanborn, Jr. | |
| 4,517,788 A | 5/1985 | Scheffers | |
| 4,528,224 A | 7/1985 | Ausnit | |
| 4,563,319 A | 1/1986 | Ausnit et al. | |
| 4,581,006 A | 4/1986 | Hugues et al. | |
| 4,582,549 A | 4/1986 | Ferrell | |
| 4,601,694 A | 7/1986 | Ausnit | |
| 4,613,475 A | 9/1986 | Hettinga | |
| 4,617,683 A | 10/1986 | Christoff | |
| 4,651,504 A | 3/1987 | Bentsen | |
| 4,655,862 A | 4/1987 | Christoff et al. | |
| 4,663,915 A | 5/1987 | Van Erden et al. | |
| 4,666,536 A | 5/1987 | Van Erden et al. | |
| 4,673,383 A | 6/1987 | Bentsen | |
| 4,691,372 A | 9/1987 | Van Erden | |
| 4,703,518 A | 10/1987 | Ausnit | |
| 4,709,398 A | 11/1987 | Ausnit | |
| 4,709,533 A | 12/1987 | Ausnit | |
| 4,710,157 A | 12/1987 | Posey | |
| 4,782,951 A | 11/1988 | Griesbach et al. | |
| 4,787,880 A | 11/1988 | Ausnit | |
| 4,790,126 A | 12/1988 | Boeckmann | |
| 4,807,300 A | 2/1989 | Ausnit et al. | |
| 4,812,074 A | 3/1989 | Ausnit et al. | |
| 4,828,778 A | 5/1989 | Gelsomini et al. | |
| 4,840,012 A | 6/1989 | Boeckmann | |
| 4,840,611 A | 6/1989 | Van Erden et al. | |
| 4,842,799 A | 6/1989 | Kusayama | |
| 4,844,759 A | 7/1989 | Boeckmann | |
| 4,850,178 A | 7/1989 | Ausnit | |
| 4,876,842 A | 10/1989 | Ausnit | |
| 4,878,987 A | 11/1989 | Ven Erden | |
| 4,892,414 A | 1/1990 | Ausnit | |
| 4,892,512 A | 1/1990 | Branson | |
| 4,894,975 A | 1/1990 | Ausnit | |
| 4,909,017 A | 3/1990 | McMahon et al. | |
| 4,924,655 A | 5/1990 | Posey | |
| 4,925,318 A | 5/1990 | Sorensen | |
| 4,929,225 A | 5/1990 | Ausnit et al. | |
| 4,941,307 A | 7/1990 | Wojcik | |
| 4,969,309 A | 11/1990 | Schwarz et al. | |
| 4,974,395 A | 12/1990 | McMahon | |
| 4,993,212 A | 2/1991 | Veoukas | |
| 5,005,707 A | 4/1991 | Hustad et al. | |
| 5,014,498 A | 5/1991 | McMahon | |
| 5,025,535 A * | 6/1991 | Kusayama | 24/433 |
| 5,027,584 A | 7/1991 | McMahon et al. | |
| 5,036,643 A | 8/1991 | Bodolay | |
| 5,042,224 A | 8/1991 | McMahon | |
| 5,046,300 A | 9/1991 | Custer et al. | |
| 5,057,259 A | 10/1991 | Parmelee | |
| 5,063,639 A | 11/1991 | Boeckmann et al. | |
| 5,067,208 A | 11/1991 | Herrington, Jr. et al. | 24/400 |
| 5,072,571 A | 12/1991 | Boeckmann | |
| 5,085,031 A | 2/1992 | McDonald | |
| 5,092,831 A | 3/1992 | James et al. | |
| 5,096,516 A | 3/1992 | McDonald et al. | |
| 5,105,603 A | 4/1992 | Natterer | |
| 5,107,658 A | 4/1992 | Hustad et al. | |
| 5,111,643 A | 5/1992 | Hobock | |
| 5,116,301 A | 5/1992 | Robinson et al. | |
| 5,127,208 A | 7/1992 | Custer et al. | |
| 5,131,121 A * | 7/1992 | Herrington, Jr. et al. | 24/436 |
| 5,147,272 A | 9/1992 | Richison et al. | |
| 5,161,286 A | 11/1992 | Herrington, Jr. et al. | 24/387 |
| 5,179,816 A | 1/1993 | Wojnicki | |
| 5,188,461 A | 2/1993 | Sorensen | |
| 5,211,482 A | 5/1993 | Tilman | |
| 5,247,781 A | 9/1993 | Runge | |
| 5,254,073 A | 10/1993 | Richison et al. | |
| 5,259,904 A | 11/1993 | Ausnit | |
| 5,273,511 A | 12/1993 | Boeckman | |
| 5,322,579 A | 6/1994 | Van Erden | |
| 5,334,127 A | 8/1994 | Bruno et al. | |
| 5,383,989 A | 1/1995 | McMahon | |
| 5,400,565 A | 3/1995 | Terminella et al. | |
| 5,400,568 A | 3/1995 | Kanemitsu et al. | |
| 5,405,478 A | 4/1995 | Richardson et al. | 156/308.4 |
| 5,405,629 A | 4/1995 | Marnocha et al. | |
| 5,412,924 A | 5/1995 | Ausnit | |
| 5,415,904 A | 5/1995 | Takubo et al. | |
| 5,425,216 A | 6/1995 | Ausnit | |
| 5,425,825 A | 6/1995 | Rasko et al. | |
| 5,435,864 A | 7/1995 | Machacek et al. | |
| 5,448,807 A | 9/1995 | Herrington, Jr. | 24/399 |
| 5,470,156 A | 11/1995 | May | |
| 5,482,375 A | 1/1996 | Richardson et al. | 383/64 |
| 5,489,252 A | 2/1996 | May | |
| 5,492,411 A | 2/1996 | May | |
| 5,505,037 A | 4/1996 | Terminella et al. | |
| 5,509,735 A | 4/1996 | May | |
| 5,511,884 A | 4/1996 | Bruno et al. | |
| 5,519,982 A | 5/1996 | Herber et al. | |
| 5,525,363 A | 6/1996 | Herber et al. | |
| 5,536,460 A | 7/1996 | Kuse | 264/161 |
| 5,542,902 A | 8/1996 | Richison et al. | |
| 5,551,127 A | 9/1996 | May | |
| 5,551,208 A | 9/1996 | Van Erden | |
| 5,557,907 A | 9/1996 | Malin et al. | |
| 5,558,613 A | 9/1996 | Tilman et al. | |
| 5,561,966 A | 10/1996 | English | |
| 5,564,259 A | 10/1996 | Stolmeier | |
| 5,573,614 A | 11/1996 | Tilman et al. | |
| 5,592,802 A | 1/1997 | Malin et al. | |
| 5,613,934 A | 3/1997 | May | |
| 5,628,566 A | 5/1997 | Schreiter | |
| 5,643,620 A | 7/1997 | Brun, Jr. | |
| 5,647,671 A | 7/1997 | May | |
| 5,664,299 A | 9/1997 | Porchia et al. | 24/400 |
| 5,669,715 A | 9/1997 | Dobreski et al. | |
| 5,682,730 A | 11/1997 | Dobreski | |
| 5,702,797 A | 12/1997 | Sakakibara et al. | |
| 5,725,312 A | 3/1998 | May | |
| 5,782,733 A | 7/1998 | Yeager | |
| 5,788,378 A | 8/1998 | Thomas | |
| 5,792,408 A | 8/1998 | Akeno et al. | |
| 5,823,933 A | 10/1998 | Yeager | |
| 5,833,791 A | 11/1998 | Bryniarski et al. | |
| 5,836,056 A | 11/1998 | Porchia et al. | 24/400 |
| 5,902,611 A | 5/1999 | Stegmaier | |
| 5,906,438 A | 5/1999 | Laudenberg | |
| 5,924,173 A | 7/1999 | Dobreski et al. | 24/400 |
| 5,935,504 A | 8/1999 | Bienick et al. | |
| 5,938,997 A | 8/1999 | Sakakibara et al. | |
| 5,948,337 A | 9/1999 | Sakakibara et al. | |
| 5,956,815 A | 9/1999 | O'Connor et al. | 24/30.5 R |
| 5,956,924 A | 9/1999 | Thieman | |

| | | | | | | |
|---|---|---|---|---|---|---|
| 5,971,738 A | 10/1999 | Jens et al. | | 6,363,692 B2 | 4/2002 | Thieman ...................... 53/412 |
| 6,042,754 A | 3/2000 | Yang et al. | | 6,376,035 B1 * | 4/2002 | Dobreski et al. .......... 428/35.2 |
| 6,044,621 A | 4/2000 | Malin et al. | | 6,378,177 B1 * | 4/2002 | Athans et al. ........... 24/585.12 |
| 6,138,436 A | 10/2000 | Malin et al. | | 6,449,924 B2 | 9/2002 | McMahon et al. ............. 53/412 |
| 6,138,439 A | 10/2000 | McMahon et al. | | 6,474,045 B2 | 11/2002 | McMahon et al. ............. 53/412 |
| 6,209,287 B1 | 4/2001 | Thieman ...................... 53/412 | | | | |
| 6,216,423 B1 | 4/2001 | Thieman ...................... 53/412 | | | | |
| 6,290,391 B1 | 9/2001 | Buchman ...................... 383/5 | | * cited by examiner | | |

INJECTION-MOLDED END STOP FOR A SLIDER-OPERATED FASTENER

REFERENCE TO RELATED APPLICATIONS

This application is a divisional of U.S. patent application Ser. No. 09/636,244, filed Aug. 10, 2000, now allowed; which was filed concurrently with U.S. patent application Ser. No. 09/636,421 entitled "Slider-Operated Fastener With Spaced Notches and Associated Preseals," U.S. patent application Ser. No. 09/637,037 entitled "Method of Applying a Slider to a Fastener-Carrying Plastic Web," U.S. patent application Ser. No. 09/635,451 entitled "Method and Apparatus for Guiding a Fastener in a Bag Making Machine," and U.S. patent application Ser. No. 09/637,038 entitled "Method and Apparatus for Making Reclosable Plastic Bags Using a Pre-Applied Slider-Operated Fastener," all of which are incorporated herein by reference in their entireties.

FIELD OF THE INVENTION

The present invention generally relates to reclosable plastic bags and, more particularly, to an injection-molded end stop for a slider-operated fastener.

BACKGROUND OF THE INVENTION

A fastener arrangement for reclosable plastic bags typically includes a fastener, a slider, and a pair of end stops. The fastener includes first and second tracks. The first track includes a first profile, and the second track includes a second profile for interlocking with the first profile. The slider is slidably mounted to the fastener for movement between opposite ends of the fastener. The end stops are located at the opposite ends of the fastener.

The end stops perform three functions: (1) preventing the slider from going past the ends of the fastener, (2) holding the profiles together to resist stresses applied to the profiles during normal use of the plastic bag, and (3) minimizing leakage from inside the plastic bag out through the fastener ends. In U.S. Pat. No. 5,067,208, each end stop is in the form of a fairly rigid strap/clip that wraps over the top of the fastener. One end of the strap is provided with a rivet-like member that penetrates through the fastener fins and into a cooperating opening at the other end of the strap. Other types of end stops are disclosed in U.S. Pat. Nos. 5,924,173, 5,833,791, 5,482,375, 5,448,807, 5,442,837, 5,405,478, 5,161,286, 5,131,121, and 5,088,971.

For example, U.S. Pat. No. 5,833,791 proposes an injection-molded end stop disposed along only an exterior of a fastener outside a pair of interlocked profiles. The narrow end stop is spaced from a cut edge at the end of the fastener and extends along the length of the fastener for only a very short distance. On the one hand, the manufacturing process of injecting softened plastic material about the fastener and molding the plastic material into the end stop is quick, efficient, and cost-effective. On the other hand, because the end stop is so limited in size and is not firmly anchored, the end stop is weaker than some other types of end stops such as the above-noted riveted strap. As a result, the end stop might not be able to withstand some of the abuses and stresses that can be inflicted by the slider during normal use of the plastic bag.

A need therefore exists for an injection-molded end stop that overcomes shortcomings associated with prior injection-molded end stops.

SUMMARY OF THE INVENTION

A fastener arrangement includes a fastener, a slider, and an injection-molded end stop. The fastener includes first and second tracks. The first track includes a first profile, and the second track includes a second profile for interlocking with the first profile. The fastener extends between first and second ends. The slider is slidably mounted to the fastener for movement between the first and second ends. The injection-molded end stop is located at at least one of the first and second ends. The end stop terminates the movement of the slider at the one of the first and second ends. The end stop includes interior plastic material disposed in an interior of the fastener between the first and second profiles. The one of the first and second ends includes a cut edge at an angle relative to an axis of the fastener extending between the first and second ends. The end stop may include exterior plastic material along an exterior of the fastener outside the first and second profiles and covering the cut edge. A method of forming the end stop is also disclosed.

BRIEF DESCRIPTION OF THE DRAWINGS

Other objects and advantages of the invention will become apparent upon reading the following detailed description and upon reference to the drawings in which.

Figure 1:
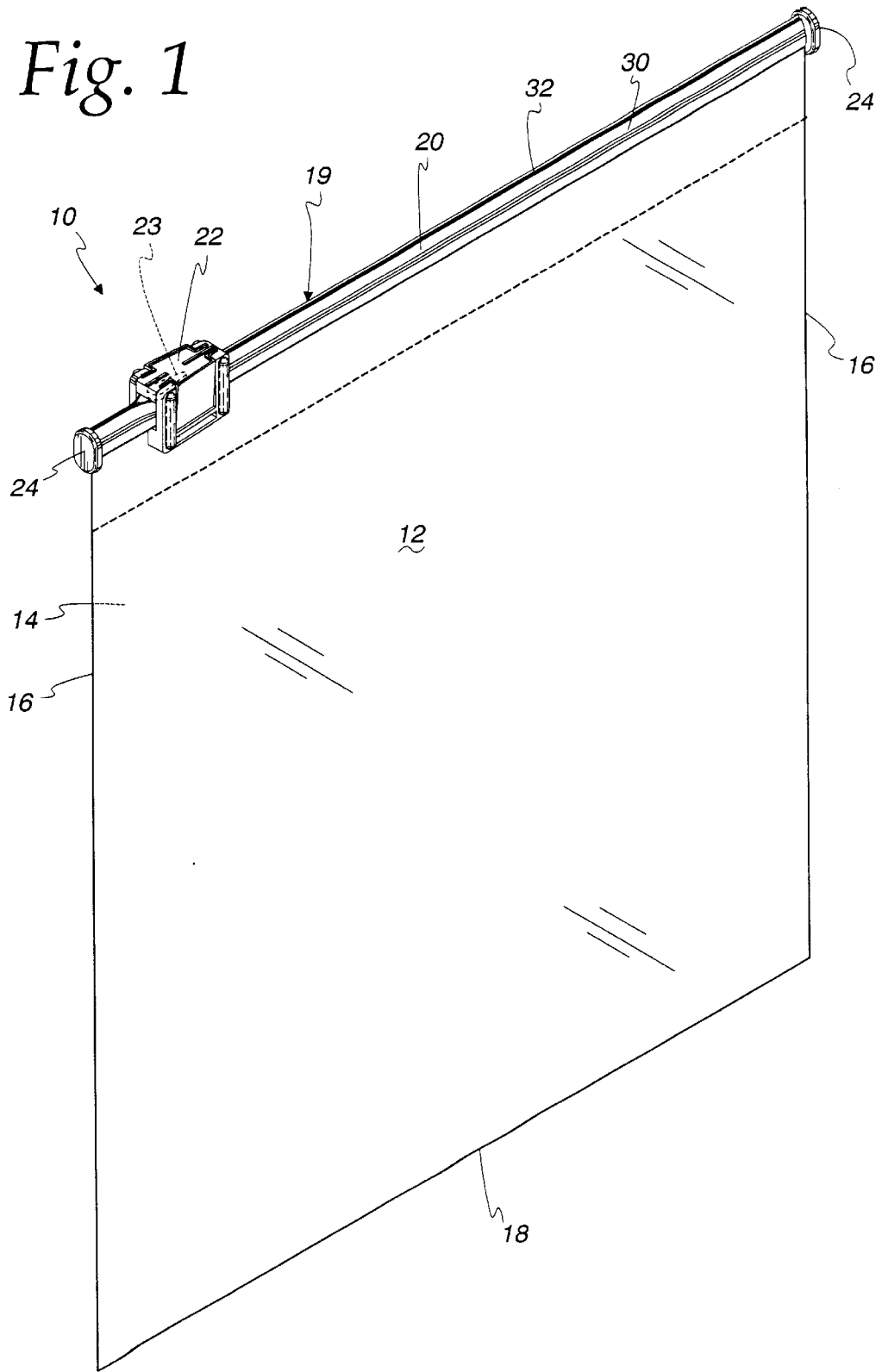
FIG. 1 is an isometric view of a reclosable plastic bag embodying the present invention, the bag including a fastener arrangement along its mouth, the fastener arrangement including a slider-carrying fastener and a pair of end stops at opposite ends of the fastener.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Figure 2:
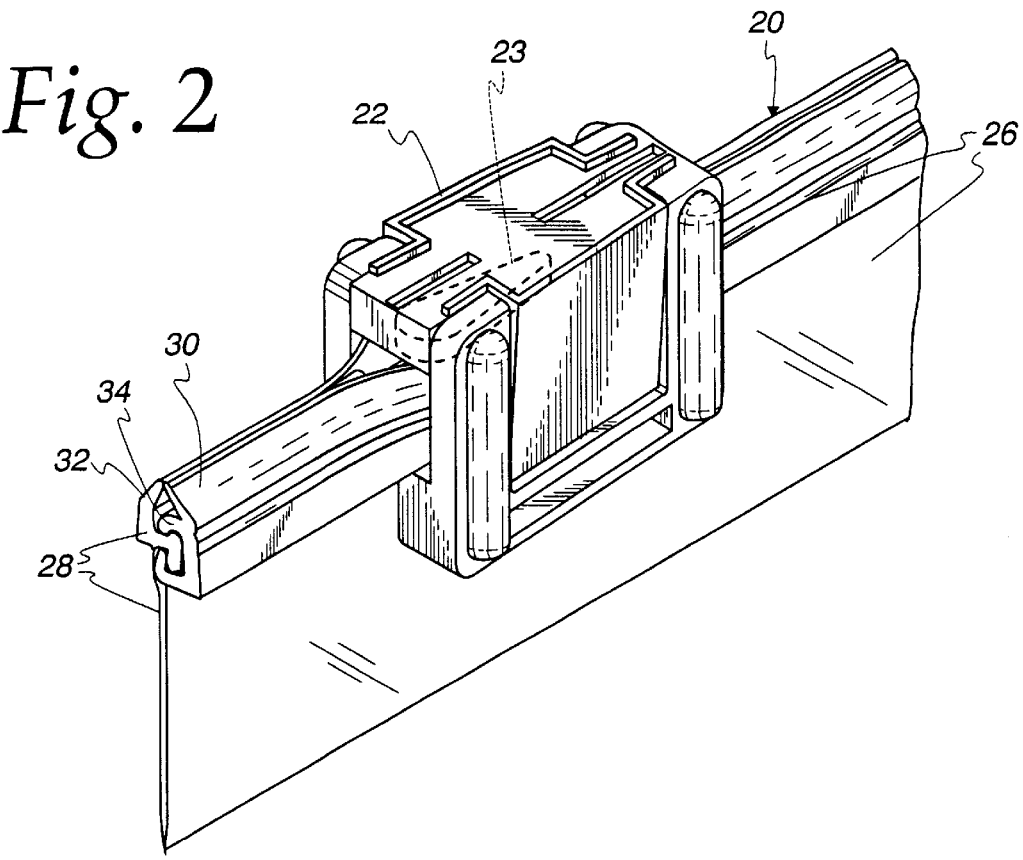
FIG. 2 is an enlarged isometric view of one end of the fastener prior to forming an end stop.

Turning to the drawings, FIG. 1 depicts a reclosable plastic bag 10 embodying the present invention. The bag 10 includes a pair of opposing panels 12 and 14 joined along a pair of sides 16 and a bottom 18 bridging the pair of sides. The bag 10 also includes a fastener arrangement 19 along its mouth opposite the bottom 18. The fastener arrangement 19 includes a fastener 20, a slider 22, and a pair of injection-molded end stops 24. Referring to FIG. 2, the fastener 20 includes first and second opposing tracks 26 and 28. The first track 26 includes a first profile 30, and the second track 28 includes a second profile 32 for interlocking with the first profile. The first profile 30 preferably forms a groove, and the second profile 32 preferably forms a rib for insertion into the groove of the first profile. Referring back to FIG. 1, the injection-molded end stops 24 are located at opposite ends of the fastener 20. The slider 22 is slidably mounted to the fastener 20 for movement between these opposite ends. The end stops 24 terminate the movement of the slider 22 at the respective opposite ends of the fastener 20. In one embodiment, the slider 22 disengages the profiles 30 and 32 as the slider 22 is moved in an "opening" direction toward one of the end stops 24, and engages the profiles 30 and 32 as the slider 22 is moved in a "closing" direction toward the other of the end stops 24.

FIG. 2 is an enlarged view of one end of the fastener 20 prior to forming the end stop 24. The end of the fastener 20 includes a cut edge 34 at an angle relative to an axis of the fastener 20 extending between the fastener's opposite ends. This angle is preferably 90 degrees such that the cut edge 34 is perpendicular to the axis of the fastener 20.

FIGS. 3 through 6 depict an end stop forming station for applying each end stop 24 to the fastener 20. Each plastic end stop 24 is made from a predetermined amount of flowable plastic material that migrates from or is injected from a supply tube 36 through one of a pair of chilled, reciprocating molds 38 and 40. In the illustrated embodiment, the supply tube 36 delivers the plastic material to the inner surface or cavity of the mold 38.

The end stop 24 is composed of one or more flowable materials capable of being solidified and anchored to the fastener 20. The flowable materials may be thermoplastic or thermoset materials. Typical base materials for making the end stop may include polyolefins such as polymethylpentene, cyclic olefin copolymer and blends of these polymers with PE or PP; thermoplastics such as ethylene-vinyl acetate, polyethylene, polyvinyl acetates, polypropylene, polyesters (PET, PPT, PBT, PEN, etc.), polyamides (nylon6, nylon 6,6, etc.), polycarbonate, polyarylates, polysulfones (PSU, PESU, etc.), polyimides (PEI, PAI, etc.), liquid crystal polymers, acrylics (PMMA, etc.), styrenics (PS, HIPS), polyphenylene oxide/sulfide (PPO/PPS), polyacetals, polyvinyl butyrate, cellulosics (cellulose acetate, triacetate, etc.), polyketones (peek, ETC.), polyurethanes, fluorohydrocarbones (PTFE, ECTFE, PVDF, etc.) and others; and thermosets such as phenolic resins, amino resins, unsaturated polyester resins, epoxy resins, urethanes, silicone resins, allyl resins, etc. Additional modifying components may include some of the following or combinations of the following: 1) tackifiers to promote wetting, flexibility, and adhesion, such as rosin, tacky polymers, terpenes, hydrocarbons, and chlorinated hydrocarbons, 2) plasticizer to promote flexibility and wetting, such as phthalates, glycolates, polybutenes, and mineral oil, 3) wax to dilute, nonblock, rigidify and promote wetting and vary setting speed, such as paraffin, microcrystalline, vegetable and synthetic wax, 4) extender to lower cost and control flow in melt or color, such as talc, barytes, or clay, 5) antioxidant to maintain and stabilize viscosity, color, and odor, such as hindered phenols, and 6) colorants.

The inner surface of each mold (e.g., mold 38 in FIG. 4) defines a funnel-shaped receiving channel 42 receiving the flowable plastic material from the supply tube and a guiding channel 44 guiding the received plastic material to the end of the fastener 20. The guiding channel 44 includes a deep section 44a and a shallow section 44b. The deep section 44a is directly coupled to a lower end of the receiving channel 42 and holds the fastener's cut edge 34 and immediately adjacent section when the molds 38 and 40 are closed around the end of the fastener 20. The deep section 44a is sufficiently deep that a small gap exists between the outer surface of the associated fastener profile and the wall of the deep section 44a when the molds 38 and 40 are closed around the end of the fastener 20. The shallow section 44b extends from the deep section 44a and holds a fastener portion proximate the cut edge 34 when the molds 38 and 40 are closed around the end of the fastener 20 (see FIG. 5). The shallow section 44b is shaped to fit snugly around the outer surface of the associated fastener profile when the molds 38 and 40 are closed around the end of the fastener 20.

Figure 3:
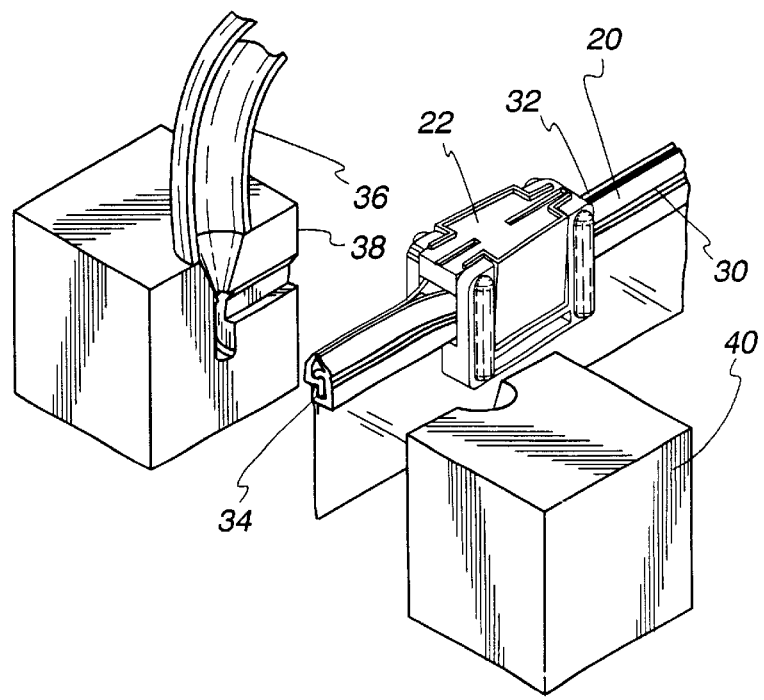
FIG. 3 is an enlarged isometric view of the end of the fastener showing a pair of reciprocating molds in an open position.
Figure 4:
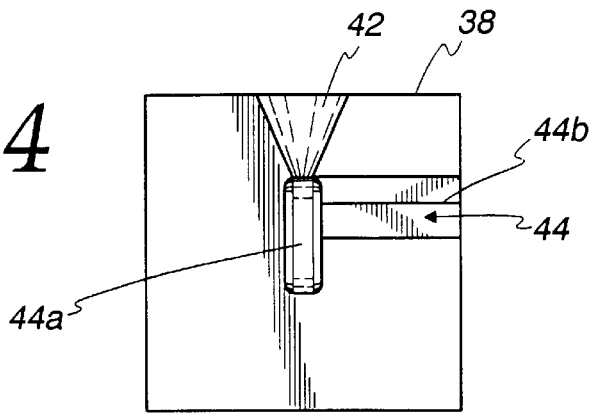
FIG. 4 is a side view of one of the molds.
Figure 5:
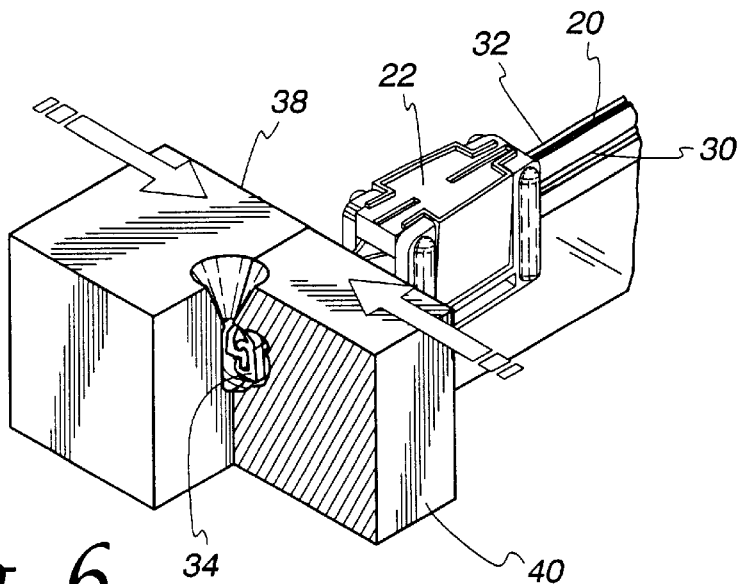
FIG. 5 is an enlarged isometric view of the end of the fastener showing the pair of molds in a closed position while forming the end stop.

At the end stop forming station, the reciprocating molds 38 and 40 are initially in an open position depicted in FIG. 3. In response to conveying the end of the fastener 20 between the separated molds 38 and 40, the molds 38 and 40 are moved to a closed position depicted in FIG. 5. While the molds 38 and 40 are closed around the end of the fastener 20, a predetermined amount of flowable plastic material is forced around and between the fastener profiles by a conventional back pressure device (not shown) coupled to the supply tube.

Because of the small gap between the wall of the deep section 44a of the guiding channel 44 and the associated fastener profile, the deep section 44a allows a portion of the injected plastic material to flow along an exterior of the fastener 20 outside the profiles 30 and 32. The exterior plastic material essentially forms a thin skin covering the outer surface of the fastener profiles 30 and 32 at the end of the fastener 20. Because no gap exists between the wall of the shallow section 44b of the guiding channel 44 and the associated fastener profile, the exterior plastic material stops migrating along the exterior of the fastener 20 at the juncture between the deep and shallow sections 44a, 44b of the guiding channel 44. In addition to flowing along an exterior of the fastener 20, the injected plastic material covers the cover edge 34. As the plastic material covers the cut edge 34, a portion of the injected plastic material enters an interior of the fastener 20 via the cut edge 34 and flows inwardly between the profiles 30 and 32, starting from the cut edge 34. The chilled molds 38 and 40 shape and solidify the plastic material.

Figure 6:
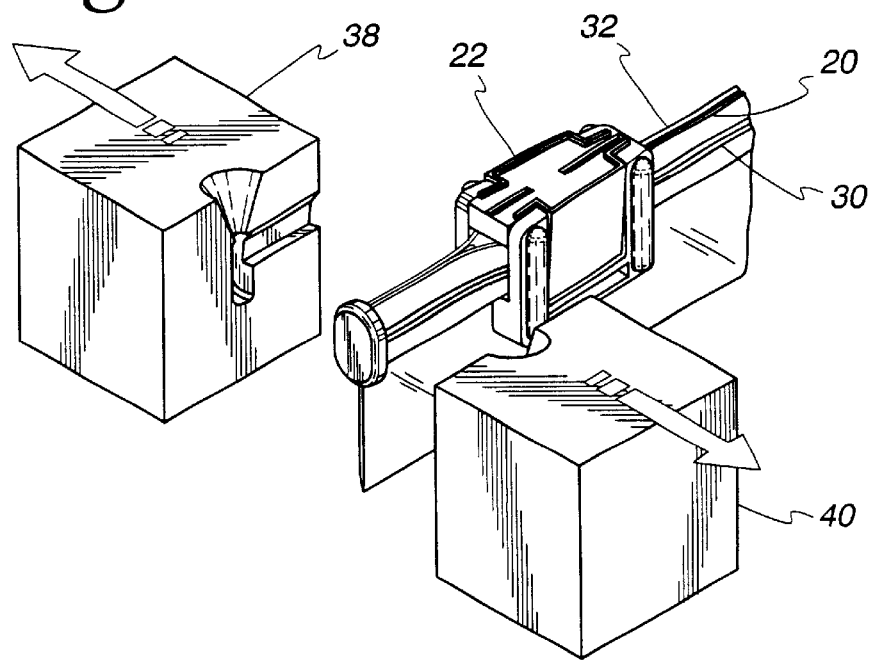
FIG. 6 is an enlarged isometric view of the end of the fastener showing the pair of molds returned to the open position after forming the end stop.
Figure 7:
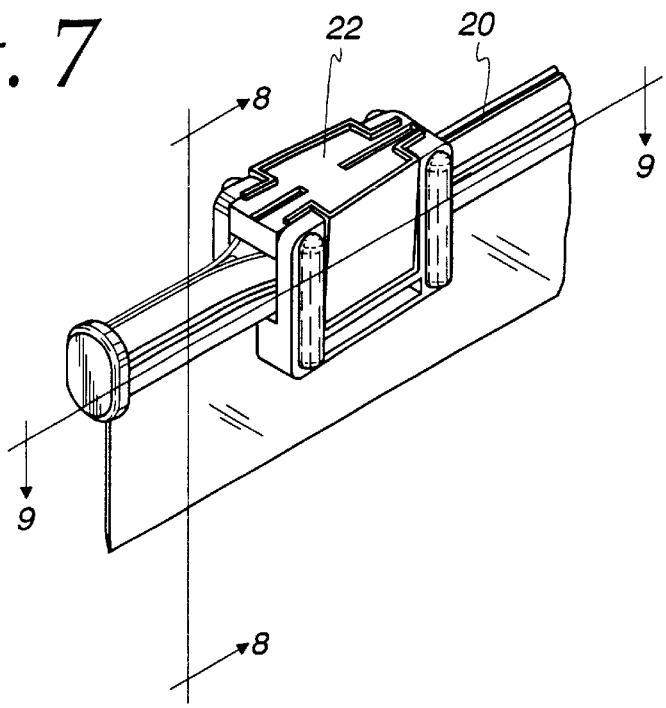
FIG. 7 is an enlarged isometric view of the end of the fastener after forming the end stop.
Figure 8:
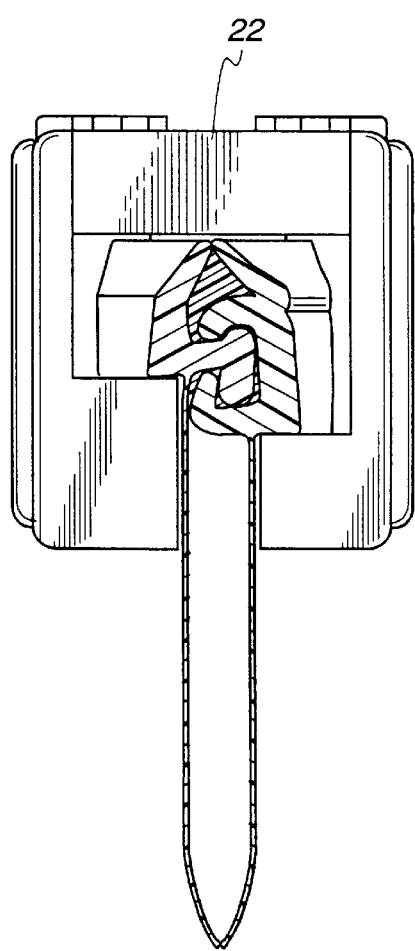
FIG. 8 is a section view taken generally along line 8—8 in FIG. 7.
Figure 9:
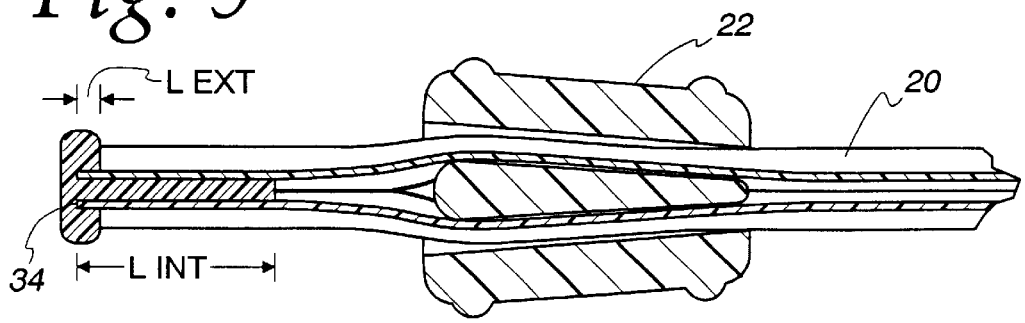
FIG. 9 is a section view taken generally along line 9—9 in FIG. 7.

After the injected plastic material is molded around and between the profiles 30 and 32 and solidified, the reciprocating molds 38 and 40 are returned to the open position depicted in FIG. 6. The resulting fastener arrangement 19, including the injection-molded end stop 24, is shown in FIG. 7. As noted above, the plastic material includes both an exterior portion and an interior portion. The exterior plastic material covers the orthogonal cut edge 34 at the extreme end of the fastener 20 and, starting from this cut edge 34, the exterior plastic material extends along the exterior of the fastener 20 for a length $L_{ext}$ equal to or greater than zero and, more preferably, at least 0.030 inch, and, most preferably, about 0.050 to 0.062 inch (see FIG. 9). In addition, the exterior plastic material has a thickness equal to or greater than zero and, most preferably, about 0.010 inch. In other words, the thickness represents the distance by which the exterior plastic material extends outwardly from the outer surface of the fastener 20. The interior plastic material extends along the interior of the fastener 20 for a length $L_{int}$ of at least about 0.015 inch, starting from the cut edge 34 (see FIG. 9).

Referring back to FIGS. 1 and 2, the slider 22 includes a separator finger 23 extending downward from the slider's top wall and between the profiles 30 and 32. As indicated by its name, the separator finger 23 helps to separate or disengage the profiles 30 and 32 as the slider 22 is moved along the fastener 20 in the "opening" direction. As the slider 22 is moved along the fastener 20 in either the "opening" or "closing" direction and approaches an end of the fastener 20, the separator finger 23 contacts the interior plastic material of the end stop 24 to terminate the movement of the slider 22. To aid in terminating the movement of the slider 22, the end stop 24 and/or the slider 22 may be designed so that the leading end of the slider simultaneously contacts the exterior plastic material of the end stop 24. Further information concerning the slider 22 and the manner in which it operates the fastener 20 may be obtained from U.S. Pat. No. 5,007,143, which is incorporated herein by reference in its entirety.

Figure 10:
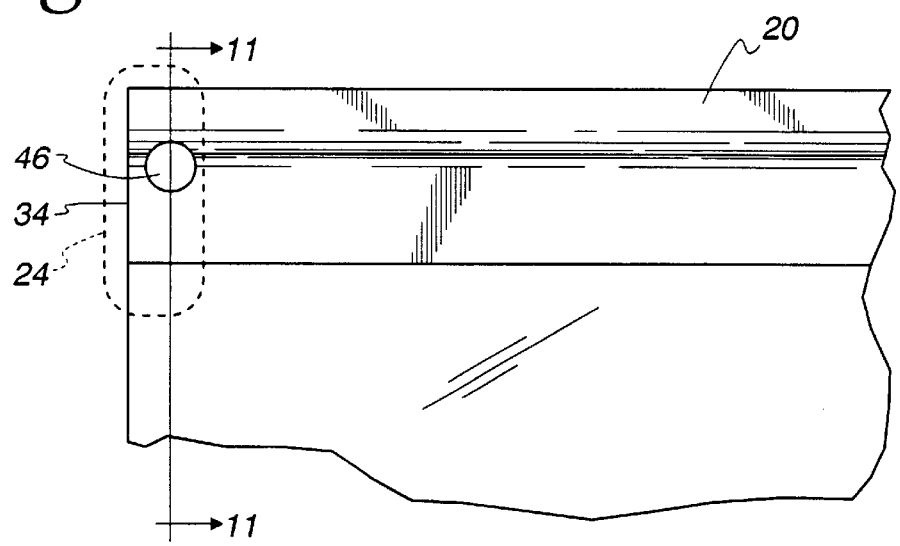
FIG. 10 is a side view of the end of the fastener prior to forming an end stop, in accordance with an alternative embodiment of the present invention.
Figure 11:
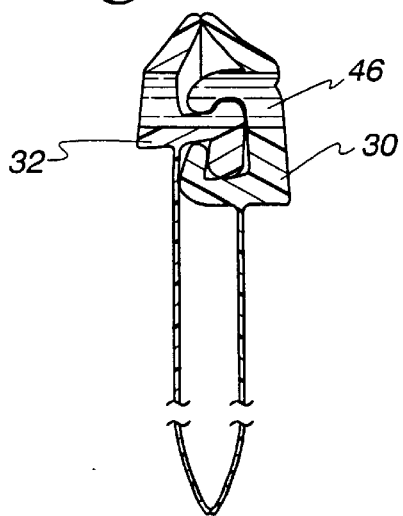
FIG. 11 is a section view taken generally along line 11—11 in FIG. 10.
Figure 12:
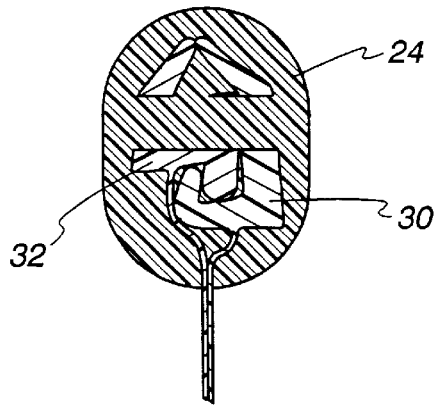
FIG. 12 is a section view similar to FIG. 11 after forming the end stop.

In the embodiment of FIGS. 1–9, the injection molding process causes some plastic material to flow into the interior of the fastener 20 between the profiles 30 and 32 via the cut edge 34. This interior plastic material increases the fastener end strength afforded by the end stop 24. To further increase the end strength, the fastener 20 may include an aperture 46 proximate each of its opposite ends as depicted in FIGS. 10 and 11. As shown in FIG. 12, the aperture 46 allows more plastic material to flow between the profiles 30 and 32 during the injection molding process. Specifically, the injection molding process causes plastic material to flow into the interior of the fastener 20 between the profiles 30 and 32 via both the cut edge 34 and the aperture 46. The aperture 46 extends from the exterior of the fastener 20 outside the profiles 30 and 32 to the interior of the fastener 20 between the profiles 30 and 32. The aperture preferably has a minimum diameter of about 0.030 inch. At smaller diameters, the aperture may be created with a puncturing needle; at larger diameters, the aperture may be created with a punch mechanism.

The end stop is preferably designed to provide a minimum slider retention force of about 3 to 4.5 pounds, which should retain the slider on the fastener during normal use of the bag. To achieve this slider retention force, various parameters may be varied relative to each other, such as (1) the length $L_{ext}$, thickness, and length $L_{int}$, of the end stop, (2) the diameter of the aperture, and (3) the composition of the end stop. Increases in one dimension may allow for decreases in another dimension. For example, it is possible to make a functional end stop by injecting the plastic material inside the fastener 20 only with no exterior plastic material.

While the present invention has been described with reference to one or more particular embodiments, those skilled in the art will recognize that many changes may be made thereto without departing from the spirit and scope of the present invention. For example, the molds can be modified to allow the simultaneous formation of a pair of injected-molded end stops on adjacent bags in a line of interconnected bags. In this case, one end stop is formed on a trailing end of a fastener segment of one bag and another end stop is formed on a leading end of a fastener segment of the next adjacent bag. To accomplish the simultaneous formation of a pair of end stops, each mold can be designed with two sets of identical channels symmetrical about a vertical plane where each set of channels is used to receive and guide flowable plastic material for forming a respective end stop. Each of these embodiments and obvious variations thereof is contemplated as falling within the spirit and scope of the claimed invention, which is set forth in the following claims.

What is claimed is:

1. A fastener arrangement, comprising:
   a fastener including first and second tracks, said first track including a first profile, said second track including a second profile for interlocking with said first profile, said fastener extending between first and second ends;
   a slider slidably mounted to said fastener for movement between said first and second ends; and
   an injection-molded end stop located at at least one of said first and second ends, said end stop terminating the movement of said slider at said one of said first and second ends, said end stop including interior plastic material disposed in an interior of said fastener between said first and second profiles.

2. The fastener arrangement of claim 1, wherein said first profile includes a rib and said second profile includes a groove for receiving said rib.

3. The fastener arrangement of claim 1, wherein said end stop has a length along said fastener of at least 0.015 inch.

4. The fastener arrangement of claim 1, wherein said end stop includes exterior plastic material disposed outside said first and second profiles.

5. The fastener arrangement of claim 4, wherein said exterior plastic material has a length along said fastener of about 0.05 to 0.062 inch.

6. The fastener arrangement of claim 4, wherein said one of said first and second ends includes a cut edge at an angle relative to an axis of said fastener extending between said first and second ends, said exterior plastic material covering said cut edge.

7. The fastener arrangement of claim 6, wherein said cut edge is generally perpendicular to said axis of said fastener.

8. The fastener arrangement of claim 4, wherein said exterior plastic material has a thickness of at least 0.010 inch.

9. The fastener arrangement of claim 1, wherein said plastic material includes one or more of thermoplastic materials, thermoset materials, tackifiers, plasticizers, waxes, extenders, antioxidants, and colorants.

10. The fastener arrangement of claim 1, wherein each of said first and second profiles includes an inner surface and an outer surface, at least one of said first and second profiles including an aperture proximate said one of said first and second ends and extending between said inner and outer surfaces, said plastic material also being disposed in said aperture.

11. The fastener arrangement of claim 1, wherein each of said first and second profiles includes an inner surface and an outer surface, each of said first and second profiles including an aperture proximate said one of said first and second ends and extending between said inner and outer surfaces, said plastic material also being disposed in said aperture of each of said profiles.

12. The fastener arrangement of claim 1, wherein said fastener includes an aperture proximate said one of said first and second ends, said aperture extending from an exterior of said fastener outside said first and second profiles to the interior of said fastener between said first and second profiles, said plastic material also being disposed in said aperture.

13. The fastener arrangement of claim 12, wherein said aperture has a minimum diameter of about 0.030 inch.

14. The fastener arrangement of claim 1, wherein said slider includes a separator finger extending between said first and second profiles, said separator finger contacting said interior plastic material to terminate the movement of said slider at said one of said first and second ends.

15. The fastener arrangement of claim 1, wherein said end stop is capable of providing at least about 3 to 4.5 pounds of retention force against the slider when the slider is moved against said end stop.

16. A fastener arrangement, comprising:
a fastener including first and second tracks, said first track including a first profile, said second track including a second profile for interlocking with said first profile, said fastener extending between first and second ends;
a slider slidably mounted to said fastener for movement between said first and second ends; and
an injection-molded end stop located at least one of said first and second ends, said end stop terminating the movement of said slider at said one of said first and second ends, said one of said first and second ends including a cut edge at an angle relative to an axis of said fastener extending between said first and second ends, said end stop including exterior plastic material covering said cut edge.

17. The fastener arrangement of claim 16, wherein said cut edge is generally perpendicular to said axis of said fastener.

18. The fastener arrangement of claim 16, wherein said exterior plastic material extends along an outside of said fastener from said cut edge, said exterior plastic material having a length along said fastener of at least 0.030 inch.

19. The fastener arrangement of claim 16, wherein said exterior plastic material extends along an outside of said fastener from said cut edge, said exterior plastic material having a thickness of at least 0.010 inch.

20. The fastener arrangement of claim 16, wherein said plastic material includes one or more of thermoplastic materials, thermoset materials, tackifiers, plasticizers, waxes, extenders, antioxidants, and colorants.

21. A fastener arrangement, comprising:
a fastener including first and second tracks, said first track including a first profile, said second track including a second profile for interlocking with said first profile, said fastener extending between first and second ends, said fastener including an aperture adjacent to said first end and extending through said first and second tracks;
a slider slidably mounted to said fastener for movement between said first and second ends; and
an injection-molded end stop located over said aperture, said end stop terminating the movement of said slider adjacent to said first end, said end stop including plastic material disposed within said aperture.

22. The fastener arrangement of claim 21, further including a second aperture in said fastener adjacent to said second end and a second injection-molded end stop located over said second aperture.

23. The fastener arrangement of claim 21, wherein said aperture has a periphery defined entirely by material comprising said first and second tracks.

24. The fastener arrangement of claim 23, wherein said periphery is circular.

25. The fastener arrangement of claim 21, wherein said aperture extends through said first and second profiles of said first and second tracks.

26. The fastener arrangement of claim 21, wherein said aperture is spaced slightly away from said first end.

27. A fastener arrangement, comprising:
a fastener including first and second tracks, said first track including a first profile, said second track including a second profile for interlocking with said first profile, said fastener extending between first and second ends, said fastener including a punched interruption extending through said first and second tracks adjacent to said first end;
a slider slidably mounted to said fastener for movement between said first and second ends; and
an injection-molded end stop located over said punched interruption, said end stop terminating the movement of said slider at said first end, said end stop including plastic material disposed within said punched interruption.

28. The fastener arrangement of claim 27, wherein said punched interruption is an aperture.

29. The fastener arrangement of claim 27, wherein said aperture is circular.

30. The fastener arrangement of claim 27, wherein said punched interruption is slightly spaced away from said first end.

31. The fastener arrangement of claim 27, further including a second punched interruption extending through said first and second tracks adjacent to said second end and a second injection-molded end stop over said second punched interruption.

* * * * *

UNITED STATES PATENT AND TRADEMARK OFFICE
CERTIFICATE OF CORRECTION

PATENT NO. : 6,662,410 B2  Page 1 of 1
DATED : December 16, 2003
INVENTOR(S) : Kolovich et al.

It is certified that error appears in the above-identified patent and that said Letters Patent is hereby corrected as shown below:

<u>Column 8,</u>
Line 36, delete "27" and insert -- 28--

Signed and Sealed this

Ninth Day of March, 2004

JON W. DUDAS
*Acting Director of the United States Patent and Trademark Office*